United States Patent [19]

Clough et al.

[11] Patent Number: 4,607,015

[45] Date of Patent: Aug. 19, 1986

[54] GLASS COMPOSITION, ITS METHOD OF FORMATION AND PRODUCTS MADE THEREFROM

[75] Inventors: Thomas J. Clough, Woodland Hills; John D. Mackenzie, Los Angeles, both of Calif.

[73] Assignee: Atlantic Richfield Company, Los Angeles, Calif.

[21] Appl. No.: 360,516

[22] Filed: Mar. 22, 1982

Related U.S. Application Data

[63] Continuation-in-part of Ser. No. 249,043, Mar. 30, 1981, abandoned.

[51] Int. Cl.[4] .......................... C03C 6/02; C03C 13/06; C03C 11/00; C03C 3/083
[52] U.S. Cl. ........................................ 501/27; 501/36; 501/39; 501/68
[58] Field of Search ...................... 501/27, 36, 39, 68; 156/99; 65/2, 22

[56] References Cited

U.S. PATENT DOCUMENTS 3,101,251 8/1963 Howell ............................... 423/118
3,666,506 5/1972 Cowan et al. ......................... 65/22
3,846,143 11/1974 Mod et al. ........................... 65/134
4,147,835 4/1979 Nishino et al. ....................... 501/77
4,153,439 5/1979 Tomic et al. ........................... 65/2

OTHER PUBLICATIONS

Banba, et al; "Safety Evaluation of Simulated High-Level Waste Glass Products (I)", from INIS atomindex 1980, 11(24), Abstract No. 571,744, Tokai Res. Establ., Japan At. Energy Res. Inst., Tokai, Japan Report 1980, JAERI-M-8706, 20 pp.
Breck, D. W.; "Zeolite Molecular Sieves", John Wiley & Sons, New York, 1974, pp. 441–495.
Mumpton, F. A.; "Natural Zeolites"; *Mineralogy and Geology of Natural Zeolites,* vol. 4 (Mineralogy Society of America, Nov. 1977).

*Primary Examiner*—Mark L. Bell
*Attorney, Agent, or Firm*—John C. Martin, Jr.

[57] ABSTRACT

A glass composition is disclosed which is formed from a mixture comprising one or a plurality of natural mineral zeolites and having a melting point in the range of from about 1000° to about 1500° C. The glass compositions of this invention can be formed into various glass articles, including flat glass, glass containers, glass fiber and glass foam.

11 Claims, No Drawings

GLASS COMPOSITION, ITS METHOD OF FORMATION AND PRODUCTS MADE THEREFROM

CROSS REFERENCE TO RELATED APPLICATION

This application is a continuation-in-part of application Ser. No. 249,043, filed Mar. 30, 1981, and now abandoned, of identical title.

FIELD OF THE INVENTION

The invention herein relates to glasses. While it pertains to glasses generally, it has particular pertinence to glasses which are fiberizable.

BACKGROUND OF THE INVENTION

The natural mineral zeolites are a group of hydrous alkali and/or alkaline earth aluminosilicates which have an open three-dimensional crystalline framework. While a large number of individual mineral zeolites are known and have been described in the literature, eleven minerals make up the major group of mineral zeolites: analcime, chabazite, clinoptilolite, erionite, ferrierite, heulandite, laumontite, mordenite, natrolite, phillipsite and wairakite. The chemical and physical properties of these major mineral zeolites, as well as the properties of many of the minor mineral zeolites, are described extensively in LeFond (ed.), *Industrial Minerals and Rocks* (4th edn., 1975), pp. 1235–1274; Breck, *Zeolite Molecular Sieves* (1974), especially Chapter 3; and, Mumpton (ed.), *Mineralogy and Geology of Natural Zeolites*, Vol. 4 (Mineralogical Society of America: November 1977). These publications also describe the geologic occurrence of the natural mineral zeolites and some industrial and agricultural uses which have been proposed or in which the natural mineral zeolites are now being used commercially.

It is important to note that the natural mineral zeolites are an entirely different class of materials from the "synthetic zeolites" which have been widely described in many recent articles and patents. Because there is no universally recognized system for naming the synthetic zeolites, and because some of the synthetic materials exhibit x-ray diffraction patterns which suggest possible similarities in structure with the natural mineral zeolites, some reports in the literature and patents have described certain synthetic zeolites as "synthetic" versions of the natural mineral zeolites. Thus, for instance, certain synthetic zeolites have been described as "synthetic analcime" or "synthetic mordenite" and so forth. As noted in the aforementioned Breck reference, however, this approach is technically unsound and has merely led to confusion between the two otherwise distinct classes of materials: the natural mineral zeolites and synthetic zeolites. While it has been recognized that there are structural similarities between the two groups, it is clear that the natural mineral zeolites constitute a class of materials significantly separate and distinct in structure and properties from the synthetic zeolites.

Glasses are vitreous materials composed largely of silica. Because silica is a highly refractory material, however, substantial quantities of soda ash, lime or other fluxing materials are added to the silica to permit the glass forming composition to be melted at reasonable temperatures. Small quantities of other materials, usually elemental materials or oxides, are commonly added to glass melts to provide particular properties such as color or chemical resistance to the finished glass. Heretofore, however, there has not been any report of significant usage of zeolites in glass matricies and particularly as the principal component of a glass matrix. One experiment has been reported in which a clinoptilolite and glass mixture was fired at 800° C. (well below the melting point of either) to produce what was described as a porous low density glass composition; see Mumpton, supra, p. 197, referring to Tamura Japanese published application No. 74/098,817 (1974).

BRIEF SUMMARY OF THE INVENTION

The invention herein is a glass composition formed from a molten mixture which mixture prior to melting comprises a natural mineral zeolite and which has a melting temperature in the range of from about 1000° to about 1500° C. In a preferred embodiment the natural mineral zeolite comprises a mixture of mordenite and clinoptilolite and has a melting point in the range of from about 1250° to about 1400° C. Also included within the scope of the present invention is a glass body formed from the aforesaid glass composition, as well as glass fiber formed from the aforesaid composition.

DETAILED DESCRIPTION AND PREFERRED EMBODIMENTS

In the present invention a mineral zeolite is a principal (preferably major) component of the mixture of raw materials which is melted to form the subject glass composition. As noted above, the various individual mineral zeolites are well described in the published literature. It will be understood that these materials, all being natural, will vary in composition over recognized ranges from batch to batch depending on the particular ore body (or portion of the ore body) from which the zeolites have come. It will also be understood that frequently two or more zeolitic minerals will be mixed in a particular ore body. These normally need not be separated for use in the invention, since this invention contemplates the use not only of individual mineral zeolites but also mixtures of two or more mineral zeolites. In fact in many cases it will be preferred to have a mixture of zeolites since variations in desirable properties, such as melting temperature, can often be obtained by use of such a mixture. Also present will usually be various other minerals, including amorphous materials. The presence of the other minerals does not prevent the mixture from reflecting the properties of the zeolite component.

In the present invention the mineral zeolite or mixture of mineral zeolites to be used will be chosen so as to provide a melting temperature in the range of from about 1000° to about 1500° C., preferably from about 1250° to about 1400° C. These mineral zeolites thus provide a glassy matrix at a melting temperature generally below that commonly associated with most glasses, particularly the fiberizable glasses.

Particularly preferred among the mineral zeolites as the raw materials for the glass forming mixtures are mordenite and clinoptilolite. A mixture of these two zeolites, in generally similar proportions (mixed with a lesser amount of amorphous materials and other minerals) has been found to melt in the range of about from about 1250° to about 1400° C. Thus, by itself, it provides an appropriate melting temperature without the need to add any other zeolitic minerals or any chemical fluxes.

Suitable mineral zeolites are available commercially from Anaconda Minerals Company, division of Atlantic Richfield Company.

The mineral zeolites used to form the glasses of the present invention may be incorporated into the glass forming mixture in amounts which are generally similar to the combined quantities of silica and alumina in convention glass compositions. The common inorganic oxides used in glass compositions to provide such properties as color, resistance to devitrification, thermal stability, resistance to chemical attack and the like may be incorporated along with the mineral zeolites in essentially the same proportions as are used in conventional glass compositions. The proportion of mineral zeolite in the glass forming mixture will be at least 40% by weight and preferably at least about 50% by weight of the composition. It may be desirable in some instances to add small quantities (usually not more than about 30% by weight) of scrap glass ("cullet") to the composition. It will, of course, in this case be necessary to use a cullet which does not have a significant detrimental affect on the finished properties of the zeolite based glass.

Where melting temperature reductions are desired beyond those obtainable by mixture of two or more mineral zeolites, conventional chemical fluxes such as soda ash may be added.

The glass compositions of this invention may be used to form any of a variety of types of glass bodies and articles. The glass herein is suitable for use as flat glass, container glass (including bottle glass) and so forth. It is common for glasses of this invention to show some color, particularly a light brown. It is believed that this is due to the ferric oxide present in the zeolite composition. If desired, the intensity of a light brown color so present can be diminished or eliminated by extraction of the iron from the zeolite. Alternatively the ferric iron can be reduced to ferrous iron, which will change the color from brown to blue or green. The end use of the glass made from the present glass compositions will determine whether or not color in the glass can be tolerated. The degree of coloration in a particular composition of the present invention will determine, for instance, whether bottles made of the glass will be the clear bottles used for such products as milk or the colored bottles used for products such as beer or toiletries.

The glasses of this invention are particularly useful for the formation of glass fibers. They may be fiberized in any conventional fiberization manner, including melt spinning, extrusion, extrusion followed by gas or steam jet attenuation or centrifugal extrusion followed by gas or steam jet attenuation. As with conventional glass fibers the methods of formation and collection will determine whether the glass fibers are to be used for textiles, as staple fibers or as glass wool, or insulation glass. Materials conventionally used with glass fibers such as coupling agents and polymeric binders may be equally well used with the present glass fibers.

Two properties of the zeolite glasses are especially noteworthy with respect to the glass fiber products. First, as noted above, the zeolites melt at temperatures which are generally some 50° to 150° C. lower than known glass fiber formers such as alkali resistant (zirconia-containing) glass batches and "E-glass" batches. The lower melting temperatures provide significant savings in energy usage, as well as permitting extension of service life of melting equipment such as bushings, since these can be operated at less severe conditions. Second, tests have indicated that the zeolite based glass fibers exhibit a degree of alkali resistance comparable to the zirconia-containing glass fibers. Since the zeolite based glass fibers are significantly less expensive, however, they could be used for a wide variety of reinforcement applications on alkaline environments where the high cost of the zirconia glass fibers now precludes the use of glass reinforcement.

The zeolite glasses of this invention may be formed by melting in conventional glass making furnaces, with the advantageous lower temperature processing discussed above. In addition, the zeolite glass melt does not significantly react with refractory materials of the type commonly used to line such furnaces, thus contributing to extended lining life. The lower melting temperatures of the zeolite glasses also has the advantage of reducing any sulfur emissions from glass melting operations, because sulfur compounds which may be present (as in the refractory furnace lining) have less tendency to break down into gaseous sulfur compounds at the reduced melting temperatures.

The zeolite based glasses of this invention may also be in the form of glass foams.

Also included in the scope of this invention is the formation of glass ceramics from the zeolites. This is accomplished by first forming the vitreous glass from the zeolite melt and then devitrifying the glass with controlled cooling to form ceramics of the desired crystallinity. This aspect of the invention is especially applicable to the fibrous materials, and can be used to convert "500° C. service temperature" glass fibers to "1100° C. service temperature" ceramic fibers. Crystalline phases which have been identified in ceramic fibers thus formed from a mordenite raw material are anorthite and diopsite. Of particular interest is the ability of these zeolites to form such ceramics without the use of nucleating agents; i.e., the zeolites can be considered "self-nucleating". Nucleating agents can, however, be used if desired to initiate ceramic formation.

The glasses of this invention have coefficients of expansion on the same order as many metals. Therefore, they can be used to line metal shells without incurring inordinate problems of differential expansion.

As an example of the present invention, a glass composition was formed from a mineral zeolite designated "2020A" and commercially available from Anaconda Minerals Company, division of Atlantic Richfield Company. In this experiment the glass composition was formed entirely from the commercial mordenite mineral, which melted at approximately 1350° C. to produce a brown colored glass comprising the following composition, stated in percent by weight on a dry weight basis:

TABLE I

| | |
|---|---|
| $SiO_2$ | 61.5% |
| $Al_2O_3$ | 10.2% |
| MgO | 3.8% |
| CaO | 16.7% |
| $Na_2O$ | 2.1% |
| $K_2O$ | 2.7% |
| Fe as $Fe_2O_3$ | 3.0% |

(Note that conventional aluminosilicate glass melting temperatures are on the order of 1600° C.)

Glass of this composition was remelted to form glass fibers and was found to fiberize readily and produce a good quality glass fiber.

The glass of this example was found to have a bulk density comparable to that of soda-lime (window) glass and E-glass, and a coefficient of thermal expansion approximately half way between the coefficients of those two glasses. The glass transition temperature was found to be over 10% higher than that of soda-lime glass, indicating a greater degree of stability and resistance to devitrification. An important result determined was that the glass fibers formed had alkali resistance (in 5% NaOH at 90° C.) comparable to that of samples of commercial zirconia containing "alkali resistant" glass fibers, as indicated in Table II below:

TABLE II

| | Weight Loss, %. | | |
|---|---|---|---|
| Time, Hrs. | Zeolite Glass Fibers | "E-Glass" Fibers | Commercial "Alkali Resistant" Glass Fibers |
| 24 | 3.53 | 28.17 | 2.10 |
| 48 | 3.97 | 35.78 | 4.34 |
| 72 | 5.08 | 41.94 | 5.90 |

It is thus evident that the mineral zeolite glasses of the present invention have properties at least equal to the common glasses and glass fibers of the prior art, can be formed at temperatures substantially below the temperatures used to form prior art aluminosilicate glasses, and show alkali resistant properties comparable to the much more expensive zirconia-containing glasses.

The invention herein is applicable to the formation of glass and glass fibers in common industrial glass and glass fiber making operations. The glasses and glass fibers so formed are themselves used in a wide variety of industrial applications including containers, thermal insulation, fiberous reinforcement and flat glass.

The above discussion is intended to be generally descriptive of the invention and exemplary of certain embodiments including those preferred. It will be evident to those skilled in the art, however, that there may be numerous other embodiments which are not described above but which are clearly within the scope and spirit of the present invention. It is intended, therefore, that the scope of this invention is to be limited solely by the appended claims.

What is claimed is:

1. A glass-forming mixture which forms a glass having siliceous and aluminous oxide portions upon melting, said mixture prior to melting containing more than fifty percent by weight of a natural mineral zeolite component or a mixture of such zeolite components having a melting temperature in the range of from about 1000° C. to about 1500° C. and an additional component which forms an inorganic oxide common to glass compositions upon melting.

2. The glass-forming mixture of claim 1 wherein said melting temperature of said mixture is in the range of from about 1250° C. to about 1400° C.

3. The glass-forming mixture of claim 1 or 2 wherein said natural mineral zeolite component comprises at least one natural zeolite mineral selected from the group consisting of analcime, chabazite, erionite, ferrierite, heulandite, laumontite, mordenite, natrolite, phillipsite, wairakite or mixtures thereof.

4. The glass-forming mixture of claim 1 or 2 wherein said natural mineral zeolite component comprises mordenite, or mixtures thereof with clinoptilolite.

5. The glass-forming mixture of claim 1 or 2 wherein said glass-forming mixture upon melting is formable into flat glass, a container, fiber glass or glass foam.

6. A process for forming a glass composition having siliceous and aluminous oxide portions comprising heating a glass-forming mixture containing more than 50 percent by weight of a natural mineral zeolite component having a melting temperature in the range of from about 1000° C. to about 1500° C. to a temperature above the melting point of said mixture and cooling the melted mixture to form a glass.

7. The process of claim 6 wherein said natural mineral zeolite component comprises at least one natural zeolite mineral selected from the group consisting of analcime, chabazite, erionite, ferrierite, heulandite, laumontite, mordenite, natrolite, phillipsite, wairakite or mixtures thereof.

8. The process of claim 6 wherein said natural mineral zeolite component comprises mordenite, or mixtures thereof with clinoptilolite.

9. The process of claim 6 wherein said mixture has a melting temperature in the range of from about 1250° C. to about 1400° C. and wherein said mixture is heated to at least 1250° C.

10. In the method of claims 7, 8, 9 or 6 further comprising fiberizing said glass composition.

11. In the method of claims 7, 8, 9 or 6 further comprising foaming said glass composition.

* * * * *